(12) United States Patent
Langley

(10) Patent No.: US 8,450,648 B2
(45) Date of Patent: May 28, 2013

(54) CLOSED-END WELDING ELECTRODE HOLDER

(76) Inventor: Charles Mark Langley, Diamondville, WY (US)

( * ) Notice: Subject to any disclaimer, the term of this patent is extended or adjusted under 35 U.S.C. 154(b) by 1213 days.

(21) Appl. No.: 12/323,586

(22) Filed: Nov. 26, 2008

(65) Prior Publication Data

US 2010/0126977 A1 May 27, 2010

(51) Int. Cl.
*B23K 9/28* (2006.01)
(52) U.S. Cl.
USPC ........... 219/140; 219/138; 219/141; 219/142; 219/143
(58) Field of Classification Search
USPC ................ 219/140, 138, 139, 141, 142, 143, 219/144, 70, 137.31, 137.33, 127.51, 137.52, 219/137.61
See application file for complete search history.

(56) References Cited

U.S. PATENT DOCUMENTS

| | | | | |
|---|---|---|---|---|
| 1,287,337 A * | 12/1918 | Kenyon | ........................ | 219/144 |
| 1,507,788 A * | 9/1924 | McCarty | ........................ | 219/143 |
| 1,635,764 A * | 7/1927 | Paxton | ........................ | 315/138 |
| 1,862,073 A * | 6/1932 | Woolson | ........................ | 439/477 |
| 1,883,807 A * | 10/1932 | McIntire | ........................ | 219/138 |
| 1,935,449 A * | 11/1933 | Inman | ........................ | 219/144 |
| 2,049,368 A * | 7/1936 | Gilbert | ..................... | 219/145.31 |
| 2,265,135 A * | 12/1941 | Hackmeyer | ................... | 219/138 |
| 2,372,161 A * | 3/1945 | Van Winkle et al. | ............ | 549/59 |
| 2,402,535 A * | 6/1946 | Cushman | ...................... | 219/138 |
| 2,421,723 A * | 6/1947 | Smout et al. | .................. | 219/138 |
| 2,444,798 A * | 7/1948 | Wilson | .......................... | 219/138 |
| 2,676,231 A * | 4/1954 | Pickering | ...................... | 219/138 |
| 2,783,362 A * | 2/1957 | Hassler | .................... | 219/145.23 |
| 2,899,536 A * | 8/1959 | Hoese et al. | .................... | 219/70 |
| 2,954,458 A * | 9/1960 | Mankouski | ................... | 219/138 |
| 3,493,719 A * | 2/1970 | Cribb | ............................ | 219/142 |
| 3,534,199 A * | 10/1970 | Downey et al. | ............ | 219/60 R |
| 3,708,647 A * | 1/1973 | Acker | ......................... | 219/60 A |
| 4,180,723 A * | 12/1979 | Szupillo | ........................ | 219/541 |
| 4,302,659 A * | 11/1981 | Horiba et al. | ................. | 219/270 |
| 4,365,132 A * | 12/1982 | Kazlauskas et al. | ........ | 219/60 A |
| 5,378,870 A * | 1/1995 | Krupnicki | ................ | 219/137.63 |
| 5,635,091 A * | 6/1997 | Hori et al. | ................ | 219/137.61 |
| 6,555,777 B1 * | 4/2003 | Stoppek | ..................... | 219/117.1 |

* cited by examiner

*Primary Examiner* — Joseph M Pelham
*Assistant Examiner* — Gyounghyun Bae
(74) *Attorney, Agent, or Firm* — Avery Enterprises, Inc.; Bryce D. Avery

(57) ABSTRACT

Disclosed is an electrode holder to be used in welding that has a closed-end structure that removes the gripping problems inherent with open-jawed "tong-type" electrode holders. The electrode holder contains a grooved hole that allows tighter clamping onto an electrode, easing the process of bending an electrode by hand. The electrode holder also has a comfortable handle covered by a sleeve that keeps the electrode holder cool to the touch, allowing a welding lead to be fed through the sleeve and connected to the electrode holder without removing the handle of the electrode holder.

6 Claims, 3 Drawing Sheets

CLOSED-END WELDING ELECTRODE HOLDER

CROSS REFERENCE TO RELATED APPLICATIONS

The present invention claims the benefit of U.S. Provisional Application Ser. No. 60/998,394, filed 27 Nov. 2007, entitled "A Tool For Firmly Holding Welding Electrodes" by Charles Mark Langley.

BACKGROUND OF THE INVENTION a. Field of the Invention

The present invention generally pertains to arc welding and more particularly to electrode holders used during arc welding.

b. Description of the Background

Many arc welders use electrode holders to keep an electrode in a fixed position while welding and allow the metal in the electrode to fill the weld. Typical copper electrode holders are "tong-type" that grip an electrode between a pair of openable jaws or "tongs"; in some cases, the tightness of the tongs may be adjustable by a screw or spring. Other electrode holders may use a "pistol grip" that securely grips an electrode but requires two hands to remove a used electrode and insert a new one, thus reducing efficiency.

During a welding project, an electrode may be bent at various angles to allow welding in unusual positions. A welder typically bends an electrode by hand while the electrode is gripped by the tongs of the electrode holder. The stiffness of the electrode and the brute strength needed to make it bend often cause either the electrode to pop out of the tongs or the tongs to be pried open and thus lose their grip on the electrode. To succeed in bending an electrode, a welder may permanently bend the tongs of his electrode holder until the tongs have a permanently looser grip on succeeding electrodes, especially if succeeding electrodes have a smaller diameter.

Once tongs have been bent, a welder must exercise constant care to ensure that an electrode remains tightly gripped, as even slight movement of an electrode within the tongs may severely damage a welding project. During welding projects where a welder uses hundreds of electrodes (and bends many of them by hand) per day, a copper tong-type electrode holder may require replacement every 2-4 weeks because it can no longer grip an electrode tightly enough to allow efficient and accurate welding. The bending process may also injure or cause permanent damage to the wrists of a welder because of the brute strength needed for bending. U.S. Pat. No. 2,806,126 (Gladen) adds grooves to tongs to help them grip an electrode more tightly, but even grooves cannot give an open-jawed electrode holder sufficient gripping strength to withstand constant electrode bending.

Another problem with many tong-type holders is that over time, their metal content may make them too hot to hold properly because of the extreme temperatures generated during welding. U.S. Pat. No. 6,184,492 (Busopulos) uses a handle that keeps an electrode holder cool and even allows a welding lead to be fed through the handle and conveniently connected to the electrode holder—but the handle must be removed from the electrode holder to accomplish this.

It would thus be advantageous for an electrode holder to have a closed-end structure that prevents long-term gripping problems and eliminates the need for the constant checking of electrode position within an electrode holder that is common with open-jawed electrode holders. It would also be advantageous if the electrode holder were made of a stronger metal than copper and contained a deeply-grooved hole that allows tighter clamping onto an electrode and makes bending an electrode by hand easier. It would be further advantageous if the electrode holder had a comfortable handle that could keep the electrode holder cool to the touch and allowed a welding lead to be fed through the handle and conveniently connected to the electrode holder without removing the handle of the electrode holder.

SUMMARY OF THE INVENTION

The present invention overcomes the disadvantages and limitations of the prior art by providing an electrode holder with a closed-end structure that prevents the gripping problems inherent with open-jawed electrode holders, is made of a stronger metal than copper, and contains a V-shaped hole that allows tighter clamping of an electrode and eases the process of bending an electrode by hand. This electrode holder also has a comfortable handle covered by a sleeve that keeps the electrode holder cool to the touch and allows a welding lead to be fed through the handle and connected to the electrode holder without removing the handle of the electrode holder.

The present invention may thus comprise a closed-jaw welding electrode holder that offers a tighter grip on welding electrodes, offers improved durability and extended life, allows easier replacement of old welding electrodes, and allows easier bending of welding electrodes, comprising: a head with a closed end that is made of a metal with high thermal conductivity; at least one insert within the head that is harder than the material of the head and creates a V-shaped hole within the head; a jaw that may move back and forth within a slot to bisect the V-shaped hole and allow tight gripping of a welding electrode; a body that attaches to the head; a spring fastened between the jaw and the body that governs the relative movement of the jaw with respect to the body; a sleeve that tightly encloses the body of the welding electrode holder, contains an opening to accommodate a welding lead, and improves a user's grip on the welding electrode holder; a lug that attaches a welding lead to the body; a hole in the body that can accommodate a fastener; and a fastener that fits into the hole in the body and attaches the lug, the welding lead and the body together.

The welding electrode holder may contain a head with a closed end that is made of a copper alloy. It may also contain inserts made of a metal (such as hardened carbon steel) that is harder than the material of the head and may be placed into the head without welding and without deforming or affecting the material properties of the head. The V-shaped hole may have an interior angle of approximately 45° to 60° across each vertex of the V-shaped hole.

The advantages of the present invention are the closed-end structure of the electrode holder that prevents the gripping problems inherent with open-jawed electrode holders, the V-shaped hole that allows tighter clamping onto an electrode, the consequent ease of bending an electrode by hand when compared with open-jawed holders, and the ease of replacing old electrodes.

DETAILED DESCRIPTION OF THE INVENTION

Figure 1:
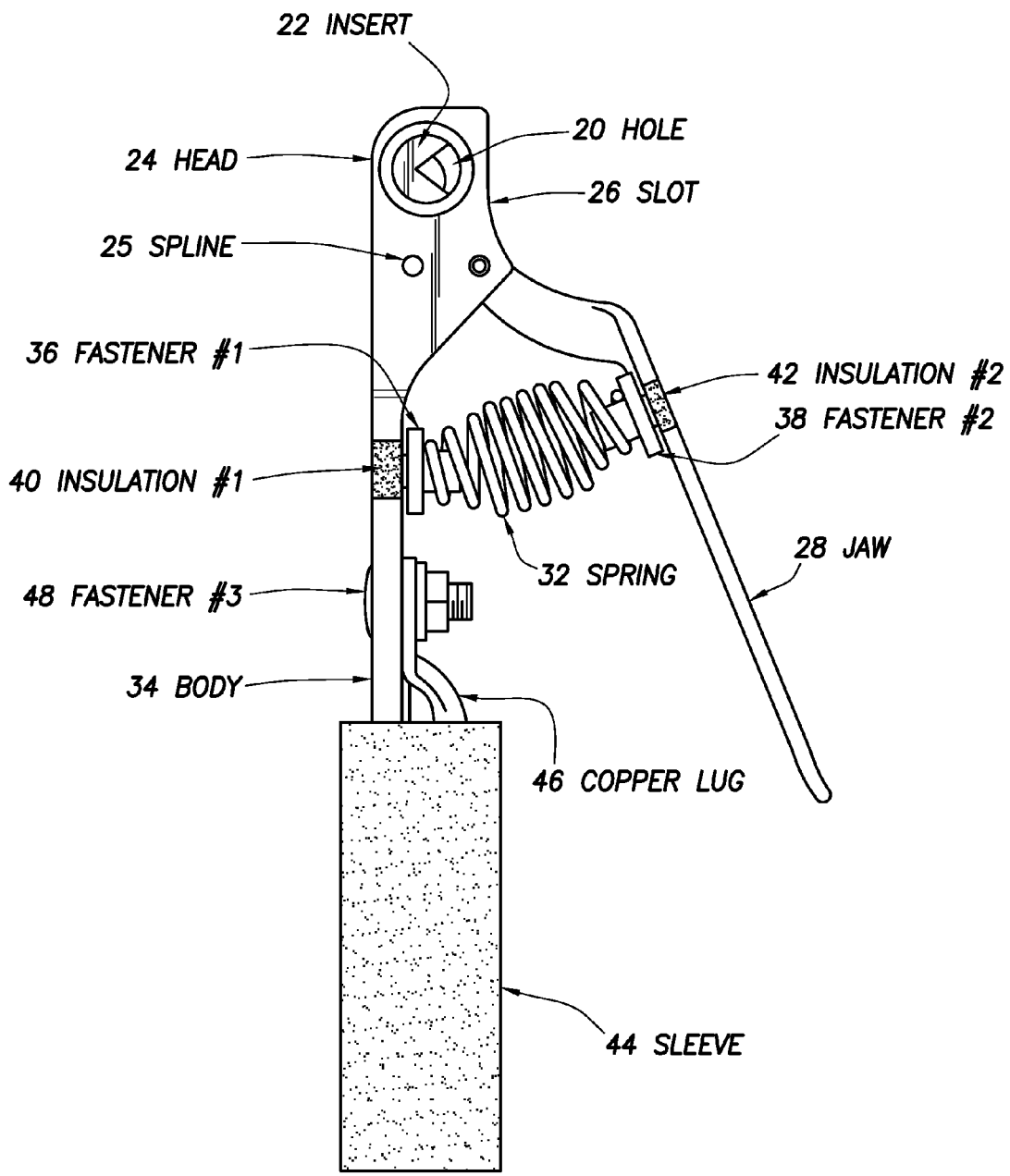
FIG. 1 is a schematic representation of the various elements of the present invention.

FIG. 1 illustrates a schematic representation of the various elements of the present invention, which holds an arc-welding electrode in place when the electrode is inserted into a hole 20 that may be created by an insert 22. The hole 20 may extend through the entire width of a head 24 and may be bisected along its length by a slot 26 that may contain a jaw 28 that may have an attached spring 32 and may be made of one or more pieces. The spring 32 may be connected between a body 34 and the jaw 28 by means of fastener #1 36 and fastener #2 38. Fastener #1 36 and fastener #2 38 may be covered by insulation #1 40 and insulation #2 42. The bottom of the body 34 may be sheathed by a sleeve 44. A copper lug 46, typically used to secure a welding lead during welding, may be fastened to the body 34 by a fastener #3 48.

The hole 20 may have an external shape that looks like the letter V may have an internal shape that look like a V, and may create a deep groove that allows for a more secure grip of a welding electrode. The groove created by the V-shaped hole 20 is deep enough to contain the entire outer diameter of a typical welding electrode. Thus, a welder has no fear of the electrode becoming dislodged from the groove during normal use of the present invention, a fear that often crops up when using "open-jawed" holders because "open-jawed" holders allow for frequent dislodging of electrodes and because a dislodged electrode may cause unwanted arcing outside of the weld zone.

The hole 20 may be created by at least one insert 22 (only one insert is shown in FIG. 1) that may be pressed (one on each side of the head 24) into the head 24 through a hole in the head 24 that is slightly smaller than each insert 22. The insert 22 may be made of a harder metal than the head 24 that resists deformation, is stronger than copper (such as hardened carbon steel), and allows an electrode to be gripped more tightly. The insert 22 may be pressed into the head 24 but should not be welded into the head 24 because welding may cause the head 24 to soften and reduce the effectiveness of the present invention. The harder metal of the insert 22 may allow the hole 20 to keep its V shape for a longer time and may allow extended use of the present invention (up to a year or more) instead of the two-to-four-week life expectancy of common "open-jawed" electrode holders. A metallic spline 25 may be used to hold each insert 22 in place within the head 24. In some embodiments, the insert 22 may contain grooves along the edges of the hole 20 that keep an electrode from sliding around within the hole 20 and allow the electrode to be gripped even more tightly.

The head 24 may be made of metal that has a high thermal conductivity to rapidly displace the heat created during welding and keep the head 24 relatively cool. This metal must also be strong enough to allow a tight grip on an electrode and allow an electrode to be easily bent. Optimum embodiments of the present invention may require a head 24 made of a copper alloy, such as brass, that contains sizable quantities of copper to allow rapid heat dissipation and extended use in the high heat and electric current used in welding without overheating or deforming but also contains other metals to make the head 24 somewhat stronger than pure copper. The head 24 may be fabricated entirely from a single piece of metal or from multiple pieces that may be connected together.

The hole 20 may be bisected along its length within the head 24 by a slot 26 that houses a jaw 28. When the jaw 28 is totally relaxed, the spring 32 may be fully extended and the jaw 28 may fill up the entire slot 26. The two sides of the hole 20 may then be blocked by the jaw 28 so that the present invention cannot grip an electrode. When the jaw 28 and body 34 are squeezed together, the spring 32 may compress and the jaw 28 may move within the slot 26 so as to unblock the two sides of the hole 20. An electrode may then be inserted into the hole 20 so as to fully occupy the V-shaped hole 20 without sticking out of the other side of the head 24. When an electrode is in place within the hole 20, the jaw 28 and body 34 may be released, allowing the spring 32 to relax and the jaw 28 to fill up the slot 26 and hold the electrode tightly in place within the hole 20. The position of the jaw 28 within the slot 26 depends on the size of the electrode in use; smaller-diameter electrodes occupy little space within the hole 20, while larger-diameter electrodes occupy more space. Thus, the jaw 28 may act as a lever to help hold an electrode in an extremely tight grip.

The spring 32 may be connected between the body 34 and the jaw 28 by fastener #1 36 and fastener #2 38. The spring 32 may be made of a metal that resists relaxation if touched by any of the tiny pieces of hot material typically created during welding. Fastener #1 36 and fastener #2 38 may be covered by insulation #1 40 and insulation #2 42, as the spring 32 must be insulated from the rest of the present invention to prevent creation of a second current path when a welding lead is attached to the present invention. Fastener #2 38 may also fix the maximum length of the spring 32 and thus the maximum opening width of the jaw 28.

The bottom of the body 34 is sheathed by a sleeve 44 that may be made of a non-conducting and thermal-insulating material (such as corrugated rubber, nylon or fiberglass) that will not deform and will not change temperature during welding. The sleeve 44 may be designed to fit tightly over the body 34 and enclose the body 34 tightly by friction without need of fasteners. Optimum embodiments of the sleeve 44 may have at least one opening in the bottom (unseen in FIG. 1) that may safely hold a welding lead. Some embodiments of the sleeve 44 may have two openings in the bottom (unseen in FIG. 1): one that may safely hold a welding lead and another that may fully enclose the body 34. Some embodiments of the present invention may also include a sheath that may cover all uncovered metallic parts of the present invention and provide both thermal and electrical insulation.

Fastener #3 48 may be used to simultaneously fasten both the copper lug 46 (which may partly extend into the sleeve 44) and a welding lead to the present invention. Fastener #3 48 should be of a type (such as a carriage bolt) that may be used in either a round or non-round hole and may allow both a welding lead and the copper lug 46 to be fastened to the body 34 with only one hand to increase welding efficiency (prior art discloses fasteners that require two hands to use). The present invention should be held while connected to the welding lead in such a way as to prevent arcing.

Figure 2:
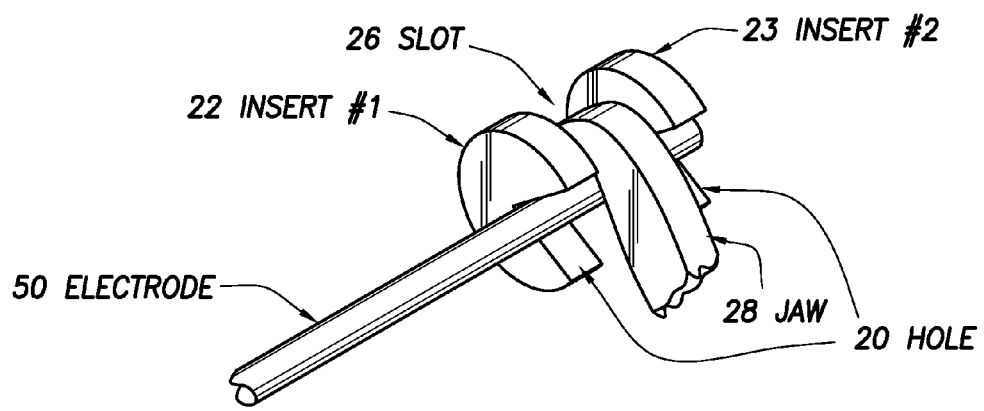
FIG. 2 is a cutaway view of the head of the present invention, seen from an angle.

FIG. 2 is a cutaway view of the head 24 of the present invention, seen from an angle. The inserts 22 and 23 may create a hole 20 that may be bisected along its length by the slot 26 that may extend the entire width of the head 24 and may contain the jaw 28. The hole 20 may be shaped like a V when seen externally in the head 24 through the inserts 22 and 23 and may internally have a V-shapeed that creates a groove deep enough to fit the entire outside diameter of an electrode 50 and thus allow tighter gripping of an electrode 50. The hole 20 may have grooves along its V shape on each side of the head 24 that may aid in gripping an electrode 50. The jaw 28 may clamp on an electrode 50 and help to hold it in place within the hole 20. To maximize the grip on the electrode, the V internal shape of the hole 20 may have an interior angle of between 45° and 60° across each vertex of the V shape.

One large advantage of the present invention is the improved strength of the electrode grip created by the hole 20 when the hole 20 contains an electrode 50 that is held in place by the jaw 28. The electrode 50 is held so tightly in place by the jaw 28 that bending the electrode 50 from its original straight position is much easier than when using a common open-jawed electrode holder. The electrode 50 may be easily bent into a right angle or even be bent more than once (to create a Z shape or even an S shape) to allow welding in difficult positions without causing a welder the debilitating and long-term wrist pain that often results over time when a welder must create enough force to bend an electrode while using an open-jawed holder.

Figure 3:
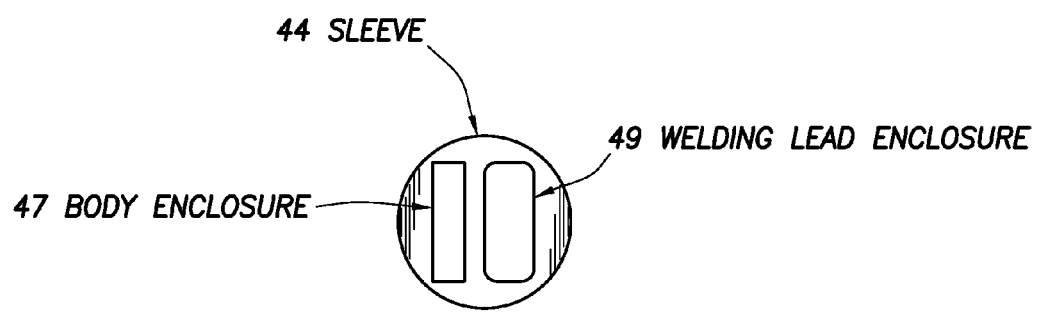
FIG. 3 is a view of the sleeve of the present invention from the bottom.

FIG. 3 illustrates a view from the bottom of the sleeve 44 of the present invention. In some embodiments, the sleeve 44 may have two openings that both extend the entire length of the sleeve 44—one to serve as a body enclosure 47 that fits tightly over the body 34 without need of fasteners and the other to serve as a welding lead enclosure 49. Prior art discloses the idea of the sleeve being removed to connect a welding lead; the present invention is an improvement because sleeve removal is not required. The sleeve 44 may also be made without the body enclosure 47, provided that the sleeve 44 has an opening at the top that allows the body 34 to be placed inside the sleeve 44.

A welding lead may be inserted into the bottom of the welding lead enclosure 49 and pulled up through the sleeve 44 so as to emerge from the top of the sleeve 44 and be fastened to the body 34 by the copper lug 46 and fastener #3 48 as shown in FIG. 1. The welding lead enclosure 49 is designed to prevent the welding lead from damage during welding, as the welding lead may undergo great movement during welding.

Figure 4:
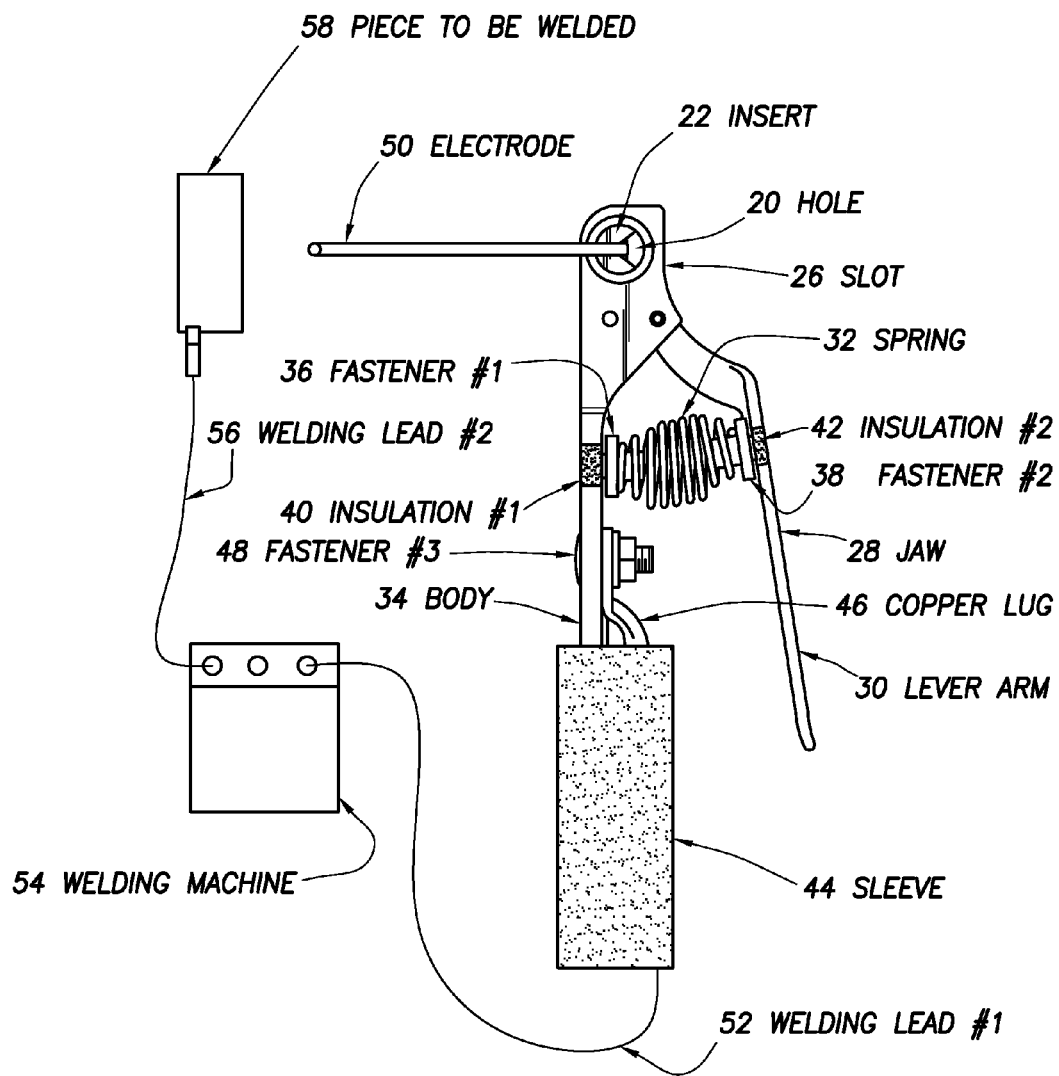
FIG. 4 is a view of the present invention as typically used in arc welding.

FIG. 4 is a view of the present invention as typically used during arc welding. To insert an electrode 50 into the hole 20, the jaw 28 and body 34 may be squeezed together, compressing the spring 32 and moving the jaw 28 within the slot 26 so as to unblock the two sides of the hole 20 and allow the electrode 50 to be inserted. When the electrode 50 is in place within the hole 20, the jaw 28 and body 34 may be released, allowing the spring 32 to relax and the jaw 28 to fill up the slot 26 and hold the electrode 50 tightly in place.

Welding lead #1 52 may be both connected to a welding machine 54 and threaded up through the welding lead enclosure 49 within the sleeve 44 (illustrated in FIG. 3). Welding lead #1 52 may then be fastened to the body 34 and to the copper lug 46 by fastener #3 48. Welding lead #2 56 may be both connected to the welding machine 54 and to a piece to be welded 58. When the electrode 50 touches the piece to be welded 58, a circuit is completed that allows electric current to flow and welding to begin. The electrode 50 may grow shorter during welding (being bent as needed) until the electrode 50 has become a stub too small for further use. A welder may then need just one hand (instead of two hands, as with an open-jawed electrode holder) to squeeze the jaw 28 and body 34 together to release the stub from the hole 20, use the other hand to quickly insert another electrode 50 into the hole 20, release the jaw 28 and body 34, and continue welding with high efficiency.

The present invention therefore provides an electrode holder with a closed-end structure that prevents the gripping problems inherent with open-jawed electrode holders. The electrode holder is made of a stronger metal than copper and contains a grooved hole that allows tighter clamping of an electrode, easing the process of bending an electrode by hand. The electrode holder also has a comfortable handle that keeps the electrode holder cool to the touch, allowing a welding lead to be fed through the insulating sleeve and connected to the electrode holder without removing the handle of the electrode holder.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A closed-jaw welding electrode holder that offers a tighter grip on welding electrodes, offers improved durability and extended life, allows easier replacement of used welding electrodes, and allows easier bending of welding electrodes comprising:
    a head with a closed end that is made of a metal with high thermal conductivity;
    at least one insert within said head that is harder than the material of said head and creates a double-V-shaped hole within said head;
    a jaw that may move back and forth within a slot to bisect said double-V-shaped hole and allow tight gripping of said welding electrode;
    a body that attaches to said head;
    a spring fastened between said jaw and said body that governs the relative movement of said jaw with respect to said body;
    a sleeve that tightly encloses said body of said welding electrode holder, contains an opening to accommodate a welding lead, and improves a user's grip on said welding electrode holder;
    a lug that attaches said welding lead to said body;
    a hole in said body that can accommodate a fastener; and,
    a fastener that fits into said hole in said body and attaches said lug, said welding lead and said body together.

2. The welding electrode holder of claim 1, wherein said metal with high thermal conductivity is a copper alloy.

3. The welding electrode holder of claim 1, wherein said inserts are made of a metal harder than the material of said head.

4. The welding electrode holder of claim 3, wherein said inserts are placed into said head without welding and without deforming or affecting the material properties of said head.

5. The welding electrode holder of claim 1, wherein said double-V shaped hole has an interior angle of between 45° and 60° across each vertex of said double-V-shaped hole.

6. The welding electrode holder of claim 1, wherein said metal harder than the material of said head is hardened carbon steel.

* * * * *